United States Patent [19]

Kawase et al.

[11] 3,929,180

[45] Dec. 30, 1975

[54] TYRES

[75] Inventors: Shoji Kawase, Iwakuni; Kenji Maeda, Kobe; Shiro Kumakawa; Takatoshi Kuratsuji, both of Iwakuni, all of Japan

[73] Assignee: Teijin Limited, Osaka, Japan

[22] Filed: Sept. 16, 1974

[21] Appl. No.: 506,506

[30] Foreign Application Priority Data

Sept. 20, 1973 Japan.............................. 48-105409

[52] U.S. Cl................. 152/359; 152/356; 57/140 R
[51] Int. Cl.².......................................... B60C 1/00
[58] Field of Search........... 57/140 R; 152/359, 356; 260/7 S

[56] References Cited
UNITED STATES PATENTS

| | | | |
|---|---|---|---|
| 3,469,001 | 9/1969 | Keefe | 57/140 R X |
| 3,553,307 | 1/1971 | Kovac et al. | 152/359 X |
| 3,690,362 | 9/1972 | Mago et al. | 152/359 |
| 3,838,561 | 10/1974 | Munting | 57/140 R |
| 3,854,515 | 12/1974 | Takemura et al. | 57/140 R X |

*Primary Examiner*—Donald E. Watkins
*Attorney, Agent, or Firm*—Sherman & Shalloway

[57] ABSTRACT

The reinforced tyre which is characterized in that its carcass material consists of the cord composed substantially of polyethylene 2,6-naphthalate, said cord, as set in the tyre, having the twisting coefficient, K-value, of 1600 to 3300, the modulus under 2% extension of 40 – 160 g/denier, and the dry heat shrinkage of no greater than 3% when exposed to the temperature of 150°C. for 30 minutes, with the definition of K as below:

$$K = T\sqrt{D}$$

in which

T denotes the number of folded twist per 10 cm of the cord, and

D denotes the total denier of the filaments constituting the cord.

5 Claims, No Drawings

TYRES

This invention relates to reinforced tyres. More particularly, the invention relates to the tyres reinforced by the carcass material composed of polyethylene-2,6-naphthalate cord having novel characteristics.

The typical of the presently known tyres include the following, classified by their skeletal structures: (a) bias tyre having the carcass in which the ply cords cross each other diagonally to the radial direction of the tyre; (b) radial tyre having the carcass in which the ply cords run paralleling or substantially paralleling the radial direction of the tyre, and the breaker cords arranged roughly in parallel with the circumferential direction of the tyre; and (c) bias-belted tyre having the carcass resembling that of bias tyre (a), i.e., in which the ply cords cross each other diagonally to the radial direction of the tyre, and the breaker cords, arranged diagonally to each other at relatively low angles to the circumferential direction of the tyre.

In the tyres of any of the above-described structures, carcass forms the very skeleton, and thus is the important constituent determining the strength of the tyre.

Accordingly, an ideal material cord forming the carcass is required to have a high strength, durability, dimensional stability, dynamic modulus, heat stability, and also high resistance to hydrolysis as well as low creep.

Heretofore various materials such as rayon, polyethylene terephthalate, 6-, and 6,6-nylon, etc. have been used as the carcass material, each of which has its strong points as well as weak points.

Rayon characteristically exhibits good dimensional stability compared with polyethylene terephthalate, 6- and 6,6-nylon, and also a relatively high modulus at low humidity. However, it has low strength, inferior durability, and furthermore, is notably hygroscopic. When its water content is increased to more than 4 – 5%, its strength and durability performances drop abruptly, and also the decrease in modulus and creep increase are conspicuous. Consequently, the tyre performances such as durability, flat spot property and cornering characteristics are substantially impaired.

The water content of rayon cord at normal state, i.e., the equillibrium water content at 65% relative humidity and 20°C. (JIS Z 8703), is 12 – 14%. Thus, in order to keep the water content no higher than 4 – 5%, either the rayon cord must be maintained under an extremely low humidity conditions, or an adequate de-watering apparatus must be employed. In the actual preparation of tyres, such additional requirement calls for great difficulties and enormous expenses.

Nylon, on the other hand, has higher strength and durability compared with rayon, but lacks dimensional stability and consequently causes non-uniformity of product tyres. Again, because the nylon filaments themselves have an essential tendency to extend, even when it is subjected to a high rate of stretching in the adhesive heat treatment and whereby imparted a low elongation, still it has a low modulus and high creep compared with rayon and polyethylene terephthalate. Consequently occasionally flat spots are formed in the tyre which causes the automobile employing the tyres uncomfortable to ride in. Furthermore the low modulus reduces the cornering power which is an important factor of tyre quality. Obviously the low cornering power makes, the control of the automobile difficult, and provide a potential denger to the driver. While the water content of nylon at normal state is 3 to 5%, advantageously lower than that of rayon, it is still easily and negatively affected by water, and must be placed under very carefully controlled conditions during the manufacturing processes.

Polyethylene terephthalate has high strength next to 6- and 6,6-nylon, and exhibits better durability than 6- and 6,6-nylon under the normal working conditions of tyres. Polyethylene terephthalate (PET for short) furthermore exhibits high modulus and low creep, and thus is a material possessing the strong points of both rayon and nylon, while covering the weak points of rayon and nylon. The heat dimensional stability of PET, however, although is better than that of 6- and 6,6-nylon, fails to reach the level of that of rayon. In the tyre-manufacturing procedures, PET is normally subjected to so-called post-cure inflation process, similarly to nylon, and still the PET-reinforced tyres show inferior uniformity compared with rayon-reinforced tyres. Again, because the PET cord has inferior dimensional stability at elevated temperatures to that of rayon, it shrinks during the vulcanization of tyre rubber, inviting some decrease in modulus. Consequently, while the PET cord in the rubber before the vulcanization of tyre has the modulus approximately equivalent to that of rayon, after the vulcanization the modulus drop more or less is inavoidable, and as the result the PET-reinforced tyres show drop in cornering power.

As above-described, the materials used in the carcasses of presently commercially available tyres such as rayon, 6- and 6,6-nylon, and PET, each has its weak points and therefore fails to contribute to excellent tyre performances allround.

An object of the present invention, therefore, is to provide the tyres of excellent uniformity, durability in general, stable operability, and comfortable driving, by using the carcass made of specific polyethylene-2,6-naphthalate cord from which the weak points of the conventional carcass materials have been eliminated but the strong points are fully retained.

The tyres of the invention are characterized in that the cord composed substantially of polyethylene 2,6-naphthalate is used as their carcass material, said cord in the tyre having a twisting coefficient, K-value, of 1600 – 3300, the modulus under 2% extension of 40 – 160 g/denier, and a dry heat shrinkage of no greater than 3% after 30 minute's exposure to the temperature of 150°C., said K-value being defined by the equation below, $$K = T\sqrt{D}$$

in which

T is the number of folded twist per 10 cm of the cord, and

D is the total denier of the filaments constituting the cord.

Hereinafter the invention will be more specifically explained. That the cord is composed "substantially of polyethylene-2,6-naphthalate" means that the cord is made of the polymer at least 85 mol% of which total recurring units consist of ethylene-2,6-naphthalate unit formed through the condensation of 2,6-naphthalenedicarboxylic acid and ethylene glycol. As the third component which may be concurrently present in the polymer at a ratio no higher than 15 mol%, monovalent, divalent, or polyvalent organic acid and/or glycol, or their functional derivatives as below may be named by way of example: naphthalenedicarboxylic acids other than 2,6-naphthalenedicarboxylic acid, terephthalic acid, chloroterephthalic acid, bromoterephthalic acid, dichloroterephthalic acid, dibromoterephthalic acid, isophthalic acid, diphenyldicarboxylic acid, diphenylsulfonedicarboxylic acid, diphenyletherdicarboxylic acid, diphenoxyethanedicarboxylic acid, sebacic acid, adipic acid, para-β-hydroxyethoxybenzoic acid, ω-hydroxycaproic acid, trimethylene glycol, tetramethylene glycol, hexamethylene glycol, decamethylene glycol, diethylene glycol, polyoxyethylene glycol, polyoxypropylene glycol, polyoxytetramethylene glycol, propylene glycol, 2,2-bis(β-hydroxyethoxyphenyl) propane, 2,2-bis(4-β-hydroxyethoxy-3,5-dibromophenyl propane, bis(β-hydroxyethoxyphenyl) sulfone, etc. More than one of the compounds as above-named may be used concurrently as the third component.

Furthermore, one or more of monofunctional compounds or their functional derivatives such as naphthoic acid, orthobenzoylbenzoic acid, polyoxyethylene glycol monomethyl ether, and/or one or more of trifunctional compounds or polyfunctional compounds of higher valency such as glycerine, pentaerythritol, trimesic acid, etc., or their functional derivatives, may also serve as the third component. The third component can be used within the ratios at which the polymer remains substantially linear.

The polymer composed substantially of polyethylene 2,6-naphthalate can be formed according to the accepted practices of polymerization. The polymerization can be effected batchwise or continuously, by the known methods such as ester-interchange or direct esterification of dicarboxylic acid and glycol, in the presence of suitable catalyst. It is also permissible to add, during the polymerization or before the termination of polymerization reaction, one or more of suitable amounts of additives such as delusterant, pigment, antioxidant, ultraviolet ray absorbent, lubricant, seed, etc.

As well known, a cord is obtained by twisting two or more ply yarns together, the yarn being an assemblage of filaments twisted together. To wit, a cord is formed through the steps of, S-twisting two filaments together, for example, to make a yarn, and fold-twisting two of the yarns together in Z direction. Thus the cord to be used as the carcass material according to the invention is obtained by first twisting together the filaments composed substantially of polyethylene 2,6-naphthalate (PEN for short) to make a yarn, and then fold-twisting plural strands of such yarn together. The "filaments composed substantially of PEN" can be obtained by melt-spinning the polymer synthesized by any of above-described polymerization methods, stretching the as-spun filaments, and heat treating the same. The spinning, stretching, and heat treating procedures can be practiced using the apparatus for making the filaments of conventional polyesters other than PEN, but must be under the conditions as well secure high degree of orientation of the PEN filaments. Thus an important requirement for the filaments to be favorably used for making the cord having the specified features according to the invention is that they are highly oriented PEN filaments. Hereinafter the preferred embodiments for making such filaments will be explained.

In the melt-spinning of PEN, a heat sleeve is installed below the spinning nozzle, to provide undrawn filaments of low degree of orientation (birefringence). Thus obtained undrawn filaments can be drawn with high draw ratios in the subsequent drawing procedure. The undrawn filaments obtained upon the melt-spinning may be first wound and then subjected to the drawing and heat treatment in a separate step, or may be drawn and heat treated in a step directly combined with the spinning. For the preparation of PEN filaments well suited for the carcass material by drawing and heat treating the undrawn filaments with high speed as will as good stability, the drawing and heat treating system using heating rolls is particularly preferred. For example, the undrawn filaments may be first preheated on hot feed roll of 110° – 150°C., drawn as the first stage by the hot feed roll and first stage-drawing roll of 170° – 220°C., to a draw ratio of at least 5.0 times and that corresponding to 85 – 95% of the intended final draw ratio, and further drawn in succession as the second stage by the first stage drawing roll and the second stage-drawing roll of at least 10°C. higher than the temperature of the first stage-drawing roll and of 190° – 250°C. According to the required physical properties in individual cases, the filaments may be further subjected to tension, or fixed length or relaxing treatment. Thus, the undrawn PEN filaments are drawn to a total draw ratio of at least 5.5 times, and concurrently heat treated. The appropriate total draw ratio normally ranges from 5.5 to 9.0 times. Thus obtained drawn and heat treated filaments exhibit excellently uniform quality, little uneven denier distribution and fluff, excellent mechanical properties such as the tensile strength of at least 8.0 g/de. and Young's modulus of at least 2000 kg/mm$^2$, and extremely favorable thermal properties such as the dry heat shrinkage of no greater than 7% at 180°C., and melting point under constant length of no lower than 284°C.

The PEN filaments are then twisted and formed into cord by the means known per se, but under the conditions as will form the cord satisfying the features specified in this invention, if necessary again subjected to an adhesive heat treatment, and incorporated into the tyre as the carcass material.

The PEN cord to be used as the carcass material according to the invention should have the twisting coefficient, K-value, of 1600 – 3300, preferably 1800 – 2500, in the state as incorporated in the tyre. When the K-value is less than 1600, the cord has insufficient durability, and may cause abrupt burst of the tyre during driving. Such is potentially dangerous to lead to traffic accidents. Whereas, when the K-value is higher than 3300, there rises a difficulty such that the so-called snarling phenomenon takes place during the twisting for cord-making, and practicable cord cannot be obtained.

Furthermore, the PEN cord to be used as the carcass material according to the invention should exhibit, as incorporated in the tyre, the modulus under 2% extension of 40 g/de. – 160 g/de., preferably from 60 to 150 g/de. The modulus is thus measured under 2% extension, i.e., $$\text{modulus} = \frac{\text{load for 2\% extension (g)}}{0.02 \times \text{cord denier (de.)}}$$

If the specified modulus of the PEN cord is below 40 g/de., the cord strength is insufficient for practical use, the cornering power of the product tyre becomes extremely small and the control of automobile becomes difficult. Particularly the stable driving at high speed, and consequently the safety in driving, is markedly impaired. Whereas, such a high modulus as exceeding 160 g/de. can be achieved by reducing the K-value, or extending the cord. However, as already mentioned, when K-value is low, the tyre shows inferior durability, and when the cord is extended to give as high modulus, it comes to show decreased dimensional stability at elevated temperatures. Thus the tyre becomes less uniform, and its utility is lost.

Still another requirement for the PEN cord to be used as the carcass material according to the invention is that its dry heat shrinkage at 150°C. for 30 minutes should be no greater than 3%, preferably within 2.5%, in the state as incorporated in the tyre. The tyre reinforced by the cord having the above-specified heat shrinkage of more than 3% lacks uniformity, and cannot provide comfortable driving.

In the reinforced tyre of the present invention, the PEN cord used as the carcass material thus should have in the state as incorporated in the tyre, the K-value, modulus, and dry heat-shrinkage within the respectively specified ranges. Of those properties, the modulus and dry heat shrinkage show little change before and after the cord is incorporated in the tyre, but K-value may undergo some change because occasionally the cord may slightly extend or shrink during the incorporating procedure into the tyre. As well known, the cord is incorporated into the tyre through the steps of setting the cord on the inner surfaces of the tyre, and vulcanizing the tyre rubber by heating, concurrently embedding the contacting portion of the cord with the tyre rubber into the surface layer of said tyre rubber. During such procedures the cord is normally slightly extended with the bias tyre and bias-belted tyre. For example, when the tyre rubber is vulcanized at 170°C. for approximately 15 minutes, the cord is extended by approximately 2%, and consequently its K-value decreases by approximately 2%. Whereas, with radial tyre the cord tends to shrink very slightly. In practice, however, the shrinkage is within 0 – 1%, causing little substantial change. Thus, the cord shows minute extension or shrinkage when incorporated into the tyre, and accordingly the K-value of the cord changes a little. Such a change can be measured with the cord detached from the tyre after the incorporation. Therefore, if the K-value of the cord in tyre must be precisely that which is predetermined, a preliminary test should be performed under the incorporating conditions to be actually applied to determine the extension or shrinkage of the cord during the procedure. Based on the test result, the starting cord should be given the appropriate twisting.

Upon applying the PEN cord as the carcass material to bias tyre, bias-belted tyre, and radial tyre according to the invention, the type uniformity can be conspicuously improved compared with the case of using nylon as the carcass material. Also it is considerably improved compared with the case of using PET carcass material. Thus the comfortable driving equivalent to that obtained with rayon-reinforced tyres is achieved. Furthermore, because the modulus of the PEN cord in the tyre of this invention is higher than that of rayon, the cornering power of the tyre is higher than that of rayon-reinforced tyre. Consequently the stable driving and safety factors of tyre are markedly improved.

Observing individual type of tyres, the bias tyre has no belt, and the inner pressure of tyre as well as the load on tyre are supported by the carcass material alone. Therefore the thermal dimensional stability and modulus of carcass material directly affect the uniformity of tyre and also the tyre rigidity, that is, the cornering power which is a determining factor of easy automobile control.

Particularly with bias tyre it is difficult to attain high level of cornering power compared with bias-belted tyre or radial tyre, due to its special structure. Therefore high modulus performance is required to the carcass material. While it is possible to impart high modulus to the conventional materials by, for example, subjecting them to a stretching treatment at the time of adhesive heat treatment, under the necessity to keep the dry heat shrinkage, which affects thermal dimensional stability, normally no greater than 4.5% due to the restrictions incurred in practical tyre-molding, the highest possible modulus attainable with the conventional materials is in the order of 100 g/de.

In the radial tyre the inner pressure as well as the load on the tyre are supported by the carcass and belt, the share of the belt being normally approximately 70% of the total work. Thus the load-bearing share of the carcass is relatively low, and the cornering power of the tyre is appreciably affected by the material and structure of belt. Similarly to bias tyre, however, still the modulus of carcass material is a by no means negligible factor for determining the cornering power. Therefore the high modulus of PEN contributes to improve the cornering power. This invention thus provides the tyre of excellent performance, particularly an improved stability in automobile control at high speed, the property required particularly to radial tyre.

The PEN cord furthermore excels over conventional materials in all aspects such as the thermodurability to the heat generated during driving, resistance to chemical deterioration under high temperatures caused by the additive chemicals to rubber, and resistance to hydrolysis due to the combined reasons of water infiltrating through the damages and cracks on the tyre formed during driving, and above-mentioned generated heat and the additives to rubber, and thus contributes to the improvement in not only the tyre performance, but also in the high-speed durability and fatigue resistance of the tyre. Because the radial tyres are manufactured through more complicated procedures than those for bias tyres and bias-belted tyres, and are more difficult of shaping, furthermore the dimentional uniformity presents more serious problem. Thus, not speaking of the belt material, the carcass material must possess high dimensional stability at elevated temperatures, and the PEN cord exhibiting the excellent thermal dimensional stability is indeed a far better material than nylon or PET.

The application of PEN as the carcass material of bias-belted tyre also achieves equivalent merit to that obtained with bias tyre and radial tyre.

Hereinafter the invention will be more specifically explained with reference to the working Examples.

In the Examples, the twisted and woven PEN filaments were adhered with an adhesive of the composition specified in Table 1, and heat treated under the conditions of Table 2, so that their adhesion with rubber may be facilitated. The other type of cord materials were applied with conventional adhesive and heat treated in the conventional manner.

Table 1

| Composition of Adhesive | |
|---|---|
| A-liquid | Parts |
| Water | 111.7 |
| Resorcinal | 14.7 |
| Formaline (37%) | 10.8 |
| Caustic soda (10%) | |
| Nipol 2518FS (40%) | 200.0 |
| Nipol LX-112 (40%) | 50.0 |
| (registered tradename of Japan Synthetic Rubber Co.) | |
| B-Liquid | |
| PEXUL (20%) | 400.0 |
| (registered tradename of I.C.I. Co.) | |
| Water | 200.0 |

The A-liquid and B-liquid were separately formulated, and then mixed to form an adhesive. The PEN cords which had been woven into a reed screen form were immersed in the liquid adhesive. The solid pick up was controlled to be approximately 8% by weight (based on the filaments).

Table 2

| Heat Treating Conditions | | | |
|---|---|---|---|
| | Drying zone | Extension zone | Setting zone |
| Treating Temp. (°C.) | 150 | 240 | 240 |
| Treating Time (min.) | 4 | 1 | 1 |

The rubber blend and vulcanizing conditions employed in the manufacture of tyre were as shown in Table 3, which were common in all the Examples.

Table 3

| Composition of Rubber Blend | | |
|---|---|---|
| Component | Carcass (part) | Tread (part) |
| Natural rubber | 80 | 80 |
| Styrene-butadiene rubber | 20 | — |
| Cis-1,4-polybutadiene rubber | — | 20 |
| Carbon black | 5 | 50 |
| ZnO | 40 | 20 |
| Diphenylguanidine | 0.2 | — |
| Dibenzothiazyldisulfide | 0.8 | — |
| Styrene-phenol condensation product | 1.0 | — |
| Phenyl-α-naphthylamine | — | 1.0 |
| Stearic acid | 1.25 | 3.0 |
| Coumarone-indene resin | 0.25 | 2.5 |
| Pine tar | — | 1.5 |
| Sulfur | 3.0 | 3.0 |
| $CaCO_3$ | 3.0 | — |

Tyre-vulcanizing conditions:
The unvulcanized tyre was maintained at 170°C. for 15 minutes under a pressure of 50 kg/cm², and vulcanized.

The following Examples A and B shows the properties of the starting filaments of the PEN cords employed in Examples 1 through 5.

EXAMPLE A

Undrawn polyethylene-2,6-naphthalate filaments having an intrinsic viscosity of 0.60 were two-stage drawing by heated roll system, to a total draw ratio of 6.6 times, and then heat treated.

The resulting polyethylene 2,6-naphthalate filaments had the below-specified properties.

| | |
|---|---|
| Denier | 1015 de. |
| Tensile strength | 9.0 g/de. |
| Elongation | 6.5 % |
| Young's modulus | 2900 kg/mm² |
| Shrinkage in boiling water | 1.5 % |
| Dry heat shrinkage (180°C. × 30 min.) | 5.6 % |

EXAMPLE B

The same undrawn filaments used in Example A was subjected to two-stage drawing to a total draw ratio of 6.1 times, and thereafter heat treated under shrinking conditions.

The properties of the resulting filaments were as follows:

| | |
|---|---|
| Denier | 1085 de. |
| Tensile strength | 8.1 g/de. |
| Elongation | 13.7 % |
| Young's modulus | 2030 kg/mm² |
| Shrinkage in boiling water | 0.1 % |
| Dry heat shrinkage (180°C. × 30 min.) | 1.0 % |

EXAMPLE 1

The PEN filaments obtained in Example A were formed into the cords of 1000 de/2, with the twist numbers varying from 30S × 30Z twists/10 cm – 75S × 75Z twists/10 cm (K value 1340 – 3353). The cords were arranged in the form of read screen, applied with the afore-specified adhesive liquid, and heat treated under 1% extension.

The screen was then used as the carcass material of the radial tyre 165SR 13 in size. The properties of the cord as taken out from the unused tyre, and the result of the tyre performance test were as shown in Table 4.

Rayon was used as the belt material. The cord structure was as follows: 1650 de/3, 30 × 30 twists/10 cm, cord density: 35 ends/5 cm, and 4-ply. The belt-cord angle (to the circumferential direction of the tyre) was 15°.

Table 4

| Run No. | Cord Properties and Tyre Performance | | | | | | |
|---|---|---|---|---|---|---|---|
| | 1 (Control) | 2 (Control) | 3 | 4 | 5 | 6 | 7 (Control) |
| Material | PET | PEN | PEN | PEN | PEN | PEN | PEN |
| Cord Structure | 100/2 | 1000/2 | 1000/2 | 1000/2 | 1000/2 | 1000/2 | 1000/2 |
| Twist Density (number of twist/10 cm) | 40×40 | 30×30 | 40×40 | 50×50 | 60×60 | 70×70 | 75×75 |
| I Twisting Coefficient (K-value) | 1788 | 1341 | 1788 | 2235 | 2682 | 3129 | 3353 |
| Ply Number | 2 | 2 | 2 | 2 | 2 | 2 | |
| Cord Density (ends/5 cm) | 48 | 48 | 48 | 48 | 48 | 48 | |
| Carcass-Cord Angle (degree) | 90 | 90 | 90 | 90 | 90 | 90 | |
| Strength (kg) | 14.0 | 15.6 | 15.1 | 14.5 | 12.4 | 10.2 | unable to be corded |
| 2% Expansion Modulus (g/de.) | 70 | 170 | 150 | 130 | 95 | 55 | |
| II Dry Heat Shrinkage*[1] (%) | 4.3 | 1.2 | 1.3 | 1.7 | 2.0 | 2.5 | |
| Disc Fatigue[-2] Strength Retenstion (%) | 88 | 20 | 77 | 85 | 92 | 95 | |

Table 4-continued

| | Run No. | Cord Properties and Tyre Performance | | | | | | |
|---|---|---|---|---|---|---|---|---|
| | | 1 (Control) | 2 (Control) | 3 | 4 | 5 | 6 | 7 (Control) |
| III | Twisting Coefficient (K-value) | 1806 | 1345 | 1793 | 2242 | 2690 | 3138 | |
| | 2% Extension Modulus (g/de) | 65 | 168 | 145 | 120 | 80 | 45 | |
| | Dry Heat Shrinkage (%) | 3.5 | 1.1 | 1.2 | 1.5 | 1.8 | 2.3 | |
| IV | Durability*3 | OK | NO | OK | OK | OK | OK | unable to be corded |
| | Uniformity*4 (index) | 100 | 65 | 70 | 77 | 83 | 90 | |
| | Cornering Power*5 (index) | 100 | 130 | 123 | 108 | 100 | 92 | |

I : green cord
II : adhered and heat treated cord
III : the cord once set in the tyre and undergone the vulcanization of tyre rubber, and then taken out from the unused tyre
IV : tyre performance Notes)
*1Dry heat shrinkage: the shrinkage caused by the exposure to 150°C. dry air for 30 minutes in freely shrinkable state
*2Disc fatigue: the strength retention after 24 hours' fatigue test with the distortion of extension/compression 7.5(%)/15(%); bending angle 75°, and rotation rate of 1800 rpm. (expressed by the strength after the fatigue test × 100/strength before the fatigue test, in % - JIS L 1017-1963)
*3Durability: when the tyre withstood the drum-running with the air pressure inside the tyre of 1.9 kg/cm², the load of 410 kg, and at a rate of 80 km/hr. for at least 20,000 km without any trouble, the tyre is marked OK. If any trouble occurred before the running distance reached 20,000 km, the tyre is marked NO.
*4Uniformity: The tyre was caused to run and its non-uniformity in the radial direction was detected by uneven force distribution (kg-Radial Force Variation). The smaller the RFV value, the better is the uniformity. In the Table, the RFV values are given by index number, based on the RFV value of PET carcass tyre which is marked 100.
*5Cornering power: The force variation (kg/degree) to the slip angle (degree) of the tyre running with the inside air pressure of 1.9 kg/cm², under the load of 410 kg, and at a rate of 80 km/hr. is shown by index number with that of PET carcass tyre marked as 100.

EXAMPLE 2

The PEN filaments obtained in Examples A and B were formed into the cords of 1000 de/2 and 48 × 48 twists/10 cm (K-value: 2146), arranged into the screen form, and adhered under the heat treatment. Varying the stretch ratio during the adhesive heat treatment of each run, screens of various properties were obtained. The screens were used as the carcass material of 165SR 13 size radial tyres. The physical properties of the cords as taken out from the unused radial tyres, and the tyre performances were as shown in Table 5.
The material and structure of the belt were the same as those employed in Example 1, and the cord density of the carcass material was 48 ends/5 cm. The carcass-cord angle was 90°.

Table 5

| | | | Carcass Cord Properties and Tyre Performance | | | | | | | | | | |
|---|---|---|---|---|---|---|---|---|---|---|---|---|---|
| | | Run No. | 8 (Control) | 9 (Control) | 10 | 11 | 12 | 13 | 14 | 15 | 16 | 17 (Control) |
| | | Material | PET | PEN | PEN | PEN | PEN | PEN | PEN | PEN | PEN | PEN |
| | | Stretch (%) | — | −6 | −4 | −2 | 0 | 2 | 4 | 6 | 8 | 10 |
| Sample | Cord Property | Twisting Coefficient (K-value) | 2167 | — | — | — | — | — | 2103 | 2082 | 2039 | 2007 | 1974 |
| | | Strength (kg) | 14.5 | — | — | — | — | — | 14.8 | 15.0 | 15.1 | 15.3 | 15.5 |
| A | | 2% Extension Modulus (g/de) | 65 | — | — | — | — | — | 135 | 143 | 150 | 158 | 165 |
| | | Dry Heat Shrinkage (%) | 3.5 | — | — | — | — | — | 1.8 | 2.1 | 2.5 | 2.7 | 3.3 |
| Filaments | Tyre Performance | Uniformity (index) | 100 | — | — | — | — | — | 75 | 82 | 87 | 96 | 103 |
| | | Cornering Power (index) | 100 | — | — | — | — | — | 110 | 113 | 119 | 124 | 130 |
| Sample | Cord Property | Twisting Coefficient (K-value) | 2167 | 2253 | 2221 | 2189 | 2135 | 2107 | — | — | — | — |
| | | Strength (kg) | 14.5 | 11.5 | 11.9 | 12.0 | 13.1 | 13.4 | — | — | — | — |
| A | | 2% Extension Modulus (g/de) | 65 | 38 | 48 | 66 | 75 | 86 | — | — | — | — |
| | | Dry Heat Shrinkage (%) | 3.5 | 0.2 | 0.3 | 0.4 | 0.5 | 0.6 | — | — | — | — |
| Filaments | Tyre Performance | Uniformity (index) | 100 | 49 | 52 | 55 | 56 | 58 | — | — | — | — |
| | | Cornering Power (index) | 100 | 92 | 96 | 100 | 101 | 104 | — | — | — | — |

EXAMPLE 3

The performance of 165SR 13 size radial tyre in which the carcass material was made of the PEN filaments obtained in Example A, is shown in Table 6, in comparison with those of the same size tyres of different carcass materials.
The twisting coefficient, K-value, of the green cord of PEN used for the carcass material was 2146, and the stretch ratio given during the adhesive heat treatment of the cord screen was 1%.

Table 6

| | | Performances of Radial Tyres With Different Carcass Materials | | | | | | |
|---|---|---|---|---|---|---|---|---|
| | Run No. | 8 (Control) | 18 (Control) | 19 (Control) | 20 | 21 | 22 | 23 |
| | Material | rayon | rayon | rayon | rayon | PEN | *1Fiber-X | Steel |
| | Cord Structure | 1650/3 | 1650/3 | 1650/3 | 1650/3 | 2000/2 | 1500/2 | 1×5×0.25 +1×0.15 |
| Belt | Twist Density (number of twists/10 cm) | 30×30 | 30×30 | 30×30 | 30×30 | 25×25 | 30×30 | 10 |
| | Ply Number | 4 | 4 | 4 | 4 | 4 | 2 | 2 |
| | Cord Density (ends/5 cm) | 35 | 35 | 35 | 35 | 35 | 35 | 40 |
| | Belt-cord Angle (degree) | 15 | 15 | 15 | 15 | 15 | 15 | 15 |
| | Material | PET | 6,6- | rayon | PEN | PEN | PEN | PEN |

Table 6-continued

| | | Performances of Radial Tyres With Different Carcass Materials | | | | | | |
|---|---|---|---|---|---|---|---|---|
| | Run No. | 8 (Control) | 18 (Control) | 19 (Control) | 20 | 21 | 22 | 23 |
| Carcass | Cord Structure | 1000/2 | 1260/2 | 1650/2 | 1000/2 | 1000/2 | 1000/2 | 1000/2 |
| | Twist Density (number of twists/10 cm) | 48×48 | 38×38 | 48×48 | 48×48 | 48×48 | 48×48 | 48×48 |
| | Ply Number | 2 | 2 | 2 | 2 | 2 | 2 | 2 |
| | Cord Density (ends/5 cm) | 46 | 45 | 50 | 45 | 45 | 45 | 45 |
| | Belt-Cord Angle (degree) | 90 | 75 | 90 | 90 | 90 | 90 | 90 |
| Cord Properties | Twisting Coefficient(K-value) | 2167 | 1870 | 2755 | 2110 | 2105 | 2106 | 2105 |
| | 2% Extension Modulus (g/de) | 65 | 35 | 80 | 129 | 127 | 130 | 132 |
| | Dry Heat Shrinkage (%) | 3.5 | 3.0 | 0.6 | 1.4 | 1.4 | 1.5 | 1.5 |
| Tyre Performance | Uniformity (index) | 100 | 128 | 66 | 73 | 80 | 71 | 69 |
| | Cornering Power (index) | 100 | 85 | 102 | 110 | 120 | 155 | 165 |

Note) *¹High-modulus polyparaphenylene terephthalamide filaments

EXAMPLE 4

The performance of 6.45 – 13 size bias tyre of which carcass material was made of the PEN filaments of Example A is shown in Table 7, in comparison with those of the same size bias tyres with different carcass materials.

The twisting coefficient, K-value, of the green cord of PEN carcass material was 2188, and the stretch ratio given during the adhesive heat treatment of the cord screen was 1%.

shown in Table 8. For comparison, the performances of similar tyres with different carcass materials are also shown in the same table.

The green PEN cord used to make the carcass material had a K-value of 2188, and the stretch ratio given in the adhesive heat treatment of the screen of said cord was 1%.

The belt was made of fiber glass ECG 75-5/0 of the twist density 10 twists/10 cm, formed into the screen of the cord density 38 ends/5 cm, and was 2-ply structure. The beltcord angle was 30°.

Table 7

| | | Performances of Bias Tyres of Various Carcass Materials | | | |
|---|---|---|---|---|---|
| | Run No. | 24 (Control) | 25 (Control) | 26 (Control) | 27 |
| Carcass | Material | PET | 6-nylon | rayon | PEN |
| | Cord Structure | 1000/3 | 1260/2 | 1650/2 | 1000/3 |
| | Twist Density (number of twist/10 cm) | 40×40 | 38×38 | 48×48 | 40×40 |
| | Ply Number | 2 | 2 | 2 | 2 |
| | Cord Density (ends/5 cm) | 50 | 50 | 50 | 50 |
| | Carcass-Cord Angle (degree) | 38 | 38 | 38 | 38 |
| Cord Properties | Twist Coefficient (K-value) | 2232 | 1868 | 2758 | 2199 |
| | 2% Extension Modulus (g/d) | 60 | 30 | 80 | 130 |
| | Dry Heat Shrinkage (%) | 3.6 | 5.0 | 0.8 | 1.5 |
| Tyre Performance | Uniformity (index) | 100 | 120 | 60 | 70 |
| | Cornering Power (index) | 100 | 70 | 105 | 135 |

Table 8

| | | Performances of Bias-Belted Tyres With Different Carcass Materials | | |
|---|---|---|---|---|
| | Run No. | 28 (Control) | 29 (Control) | 30 |
| Carcass | Material | PET | 6-nylon | PEN |
| | Cord Structure | 1000/3 | 1260/2 | 1000/3 |
| | Twist Density (number of twist/10 cm) | 40×40 | 38×38 | 40×40 |
| | Ply Number | 2 | 2 | 2 |
| | Cord Density (ends/5 cm) | 50 | 50 | 50 |
| | Carcass Cord Angle (degree) | 35 | 35 | 35 |
| Cord properties | Twisting Coefficient (K-value) | 2225 | 1857 | 2191 |
| | 2% Extension Modulus (g/d) | 65 | 34 | 128 |
| | Dry Heat Shrinkage (%) | 3.8 | 5.2 | 1.5 |
| Tyre Performance | Uniformity (index) | 100 | 126 | 65 |
| | Cornering Power (index) | 100 | 80 | 110 |

EXAMPLE 5

The performances of C78-14 size bias-belted tyre with the carcass material made of the PEN filaments obtained in Example A were tested with the results as

We claim:
1. A reinforced tyre which is characterized in that its carcass material consists of a cord composed substantially of polyethylene 2,6-naphthalate, said cord, as set in a tyre, having a twisting coefficient, K-value, of 1600 to 3300, a modulus under 2% extension of 40 – 160 g/denier, and a dry heat shrinkage of no greater than 3% when exposed to the temperature of 150°C. for 30 minutes, with the definition of K as below:

$$K = T \sqrt{D}$$

in which

T denotes the number of folded twist per 10 cm of the cord, and

D denotes the total denier of the filaments constituting the cord.

2. The tyre of claim 1, in which the cord has the twisting coefficient, K-value, of 1800 – 2500.

3. The tyre of claim 1, in which the cord has the modulus under 2% extension of 60 – 150 g/denier.

4. The tyre of claim 1, in which the cord shows the dry heat shrinkage, upon exposure to the temperature of 150°C. for 30 minutes, of no greater than 2.5%.

5. The tyre of claim 1, in which the tyre is any of bias tyre, bias-belted tyre and radial tyre.

* * * * *